United States Patent [19]

Lamy

[11] Patent Number: 4,467,672

[45] Date of Patent: Aug. 28, 1984

[54] TRANSMISSION DIFFERENTIAL

[75] Inventor: Jean-Michel Lamy, Paris, France

[73] Assignee: Regie Nationale des Usines Renault, Boulogne-Billancourt, France

[21] Appl. No.: 303,022

[22] Filed: Sep. 17, 1981

[30] Foreign Application Priority Data

Sep. 19, 1980 [FR] France ............................. 80 20211

[51] Int. Cl.³ .............................................. F16H 1/40
[52] U.S. Cl. ........................................ 74/713; 74/710
[58] Field of Search ........................... 74/710, 713, 607

[56] References Cited

U.S. PATENT DOCUMENTS 1,121,803 12/1914 Coakley ................................ 74/713

FOREIGN PATENT DOCUMENTS 140657 6/1953 Sweden ................................ 74/710

Primary Examiner—Allan D. Herrmann
Assistant Examiner—Joseph M. Rolnicki
Attorney, Agent, or Firm—Fleit, Jacobson, Cohn & Price

[57] ABSTRACT

Transmission differential consisting of a case containing two driven bevel sun gears and bevel planet gears driving the latter mounted loose on a planet wheel pin mounted through corresponding holes made in the case, characterized in that the said pin is held in position by means of a circular peg on the end of the differential closing sun wheel assembly which engages with a groove in the said planet wheel pin.

3 Claims, 3 Drawing Figures

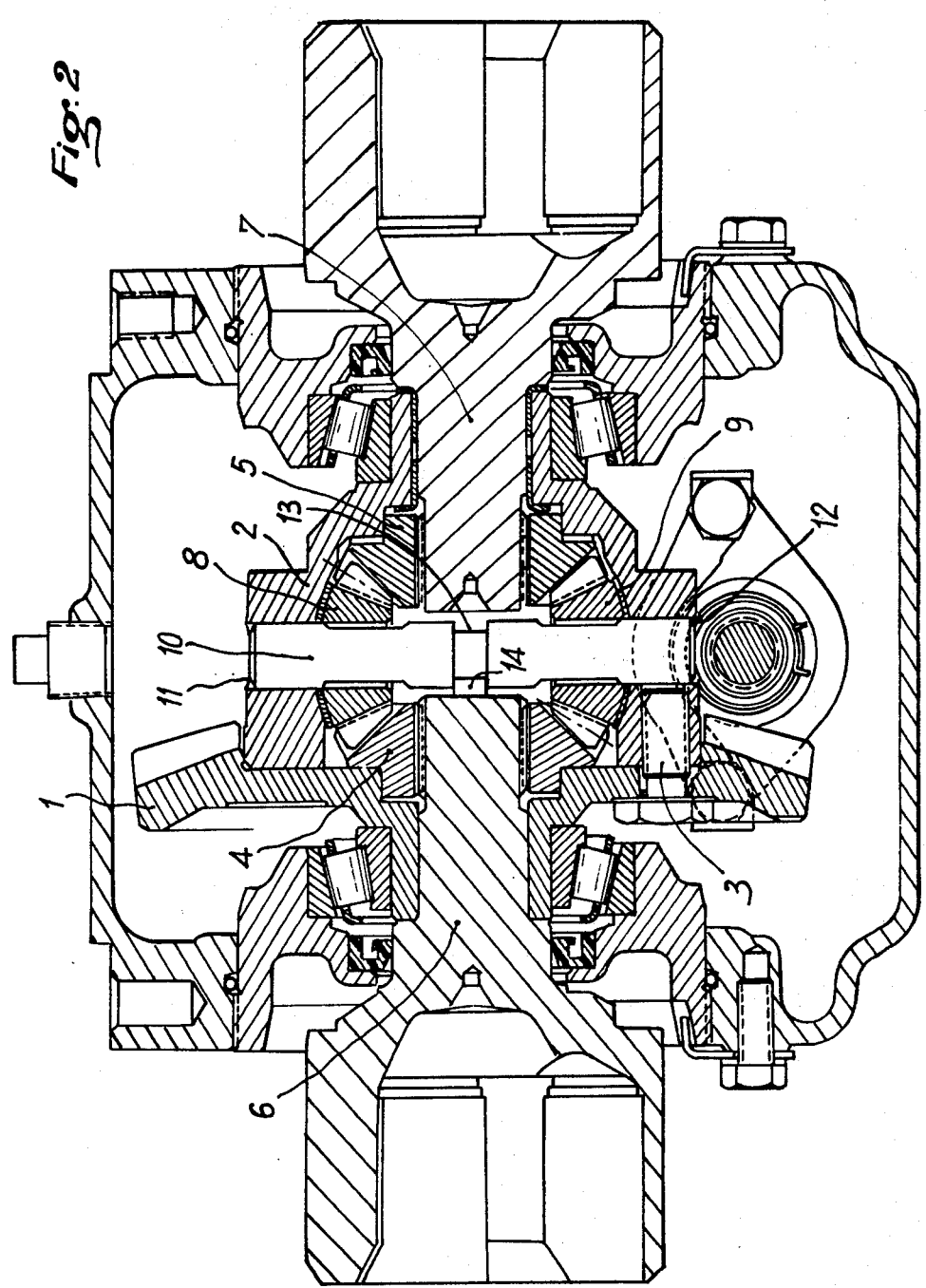

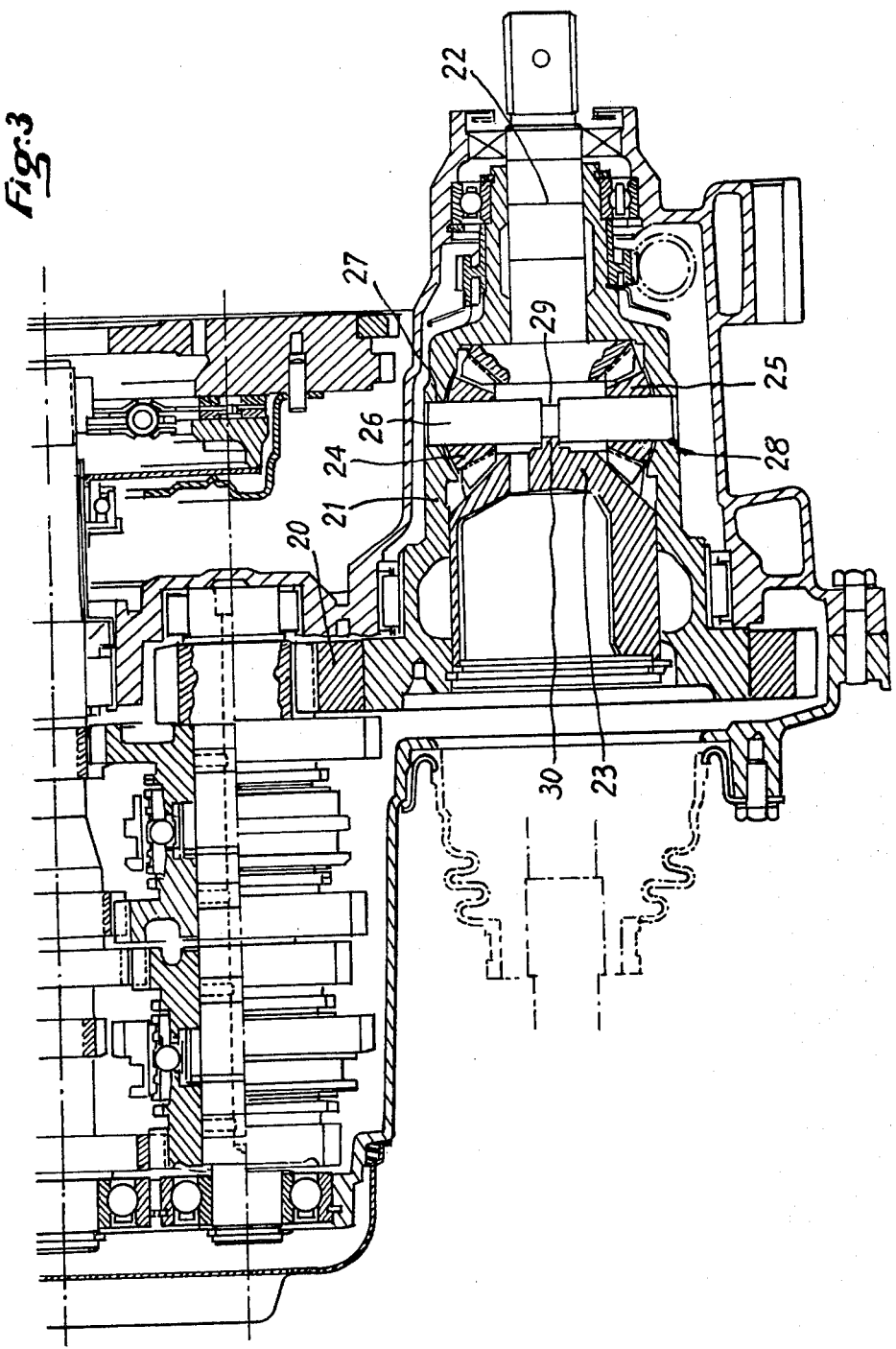

TRANSMISSION DIFFERENTIAL

BACKGROUND OF THE INVENTION

This invention relates to transmission differentials used notably for driving the drive wheels of automotive vehicles and consisting of a case enclosing two driven bevel sun gears, and bevel planet gears driving the latter mounted loose on a planet pin mounted through corresponding holes made in the said case.

Many devices are known for maintaining the planet pins, like those using set screws with dog points or spring pins.

FIG. 1 shows one of these devices, which is a spring pin system 100 in this case. These devices have the drawback of requiring additional parts and of demanding accurate machining, which leads to an increase in the cost of the transmission differential.

SUMMARY OF THE INVENTION

The purpose of the present invention is to suggest a system for pegging and restraining the planet wheel pin which avoids the previous drawbacks by eliminating any additional parts.

To this end the object of the invention is a transmission differential consisting of a case containing two driven bevel sun gears and bevel planet gears driving the latter mounted loose on a planet wheel pin mounted through corresponding holes made in the case, the said planet wheel pin being held in position by means of a circular peg at the end of the differential closure sun wheel assembly which engages with a groove in the said planet wheel pin.

Such a device according to the invention has the advantage of being simple, at the same time as enabling the planet wheel pin to be freed in rotation, which cuts down on the cases of planet wheels seizing on their pin, whilst still satisfying the requirement of providing for visual production inspection designed to check that the differential's component parts are properly installed in position.

Other characteristics and advantages of this invention will appear in the following description of embodiments given as examples, with reference to the appended drawings, in which:

BRIEF DESCRIPTION OF THE DRAWINGS

FIG. 2 is a section view of a differential according to the invention with two male sun wheels mounted on output shafts.

FIG. 3 is a section view of a differential according to the invention with one male sun wheel and one female sun wheel.

DESCRIPTION OF THE PREFERRED EMBODIMENTS

Figure 1:
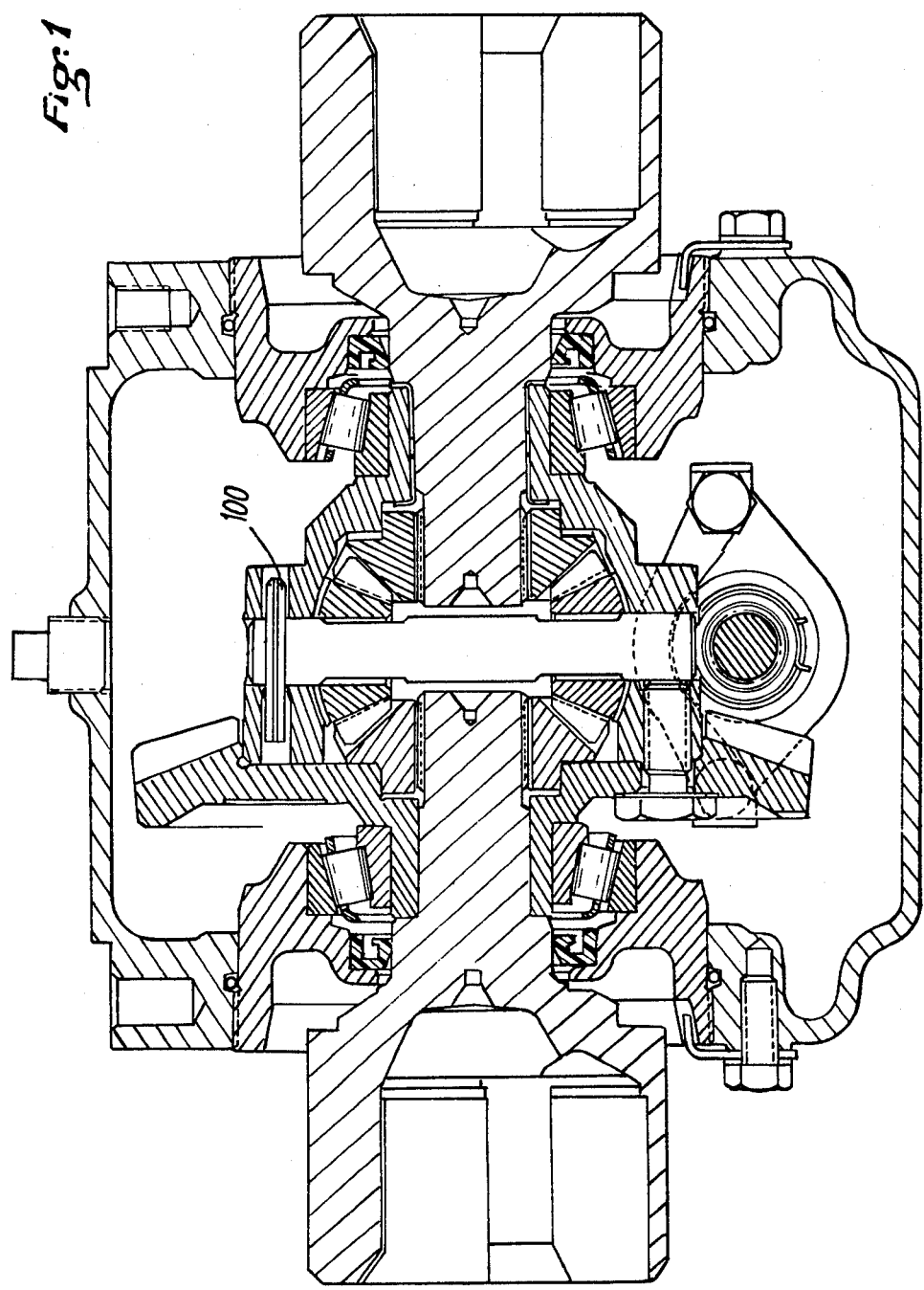
FIG. 1 is a sectional view of a known differential including a spring pin for retaining a planet wheel pin.

The differential case shown in FIG. 2 is made up of two sections: a crown wheel 1 which is the driven element in the normal bevel gearing and acts as the end plate; and a case body proper 2 assembled by screws 3 onto the said crown wheel 1. The case contains two bevel sun gears 4 and 5 respectively connected by splines to two opposite output shafts 6 and 7, with the sun wheel 4 being the closing sun wheel. These sun wheels are engaged by two opposite bevel planet gears 8 and 9 mounted loose on a planet wheel pin 10 which is itself mounted through corresponding holes 11 and 12 made in the case 2. The pin 10 is thus mounted loose in the holes 11 and 12 in the said case 2. This planet wheel pin 10 is maintained by means of a circular rectangular-section groove 13 made in the said planet wheel pin 10, which is engaged by a circular peg 14 placed on the end of the output shaft 6.

FIG. 3 illustrates another differential construction comprising the device of the invention. The differential case in FIG. 3 is made up of two sections; one driving crown wheel 20 which is the driven element of the normal bevel gearing; and a case body proper 21 which is fixed to the said crown wheel 20. The case contains a male bevel sun gear 22 and a closing female bevel sun gear (23). These sun wheels are engaged by two opposite bevel planet gears 24 and 25 mounted loose on a planet wheel pin 26 which is itself mounted through corresponding holes 27 and 28 made in the case 21. As in the case of FIG. 2, the planet wheel pin 26 is maintained by means of a rectangular-section circular groove 29 made in the said pin 26, which is engaged by a circular peg 30 made on the end of the closing female sun wheel 23.

I claim:
1. A transmission differential comprising:
   a case assembly mounted for rotation about a main axis and including a case body and a case closure;
   a first sun wheel assembly mounted in said case body for rotation about said main axis and including a first bevel sun gear and a first axle shaft drivingly connected thereto;
   a second sun wheel assembly mounted in said case closure for rotation about said main axis and including a second bevel sun gear and a second axle shaft drivingly connected thereto;
   a single planet gear pin mounted in two opposed through holes provided in said case body in a direction perpendicular to said main axis;
   two bevel planet gears rotatably mounted on said planet gear pin each in meshing engagement with both said first and said second bevel sun gears;
   a circular groove defining a bottom wall and two side walls in said planet gear pin; and
   a circular peg carried by said second sun wheel assembly and having its outer periphery in engagement with said side walls of said planet gear pin, whereby when said case closure is in place on said case body, with said second sun wheel assembly mounted in said case closure, said planet gear pin is prevented from axial movement in said through holes of said case body.

2. The transmission differential according to claim 1, wherein the circular peg is on the end of the output shaft of a male closing sun wheel.

3. The transmission differential according to claim 1, wherein the circular peg is on the end of a female closing sun wheel.

* * * * *